United States Patent Office

3,577,396
Patented May 4, 1971

3,577,396
POLYMERIZATION OF CONJUGATED DIENES BY MEANS OF A NICKEL FLUOROBORATE HYDRATE/ORGANOMETALLIC COMPOUND CATALYST SYSTEM
Morford C. Throckmorton, Akron, Ohio, assignor to The Goodyear Tire & Rubber Company, Akron, Ohio
No Drawing. Filed June 30, 1969, Ser. No. 837,906
Int. Cl. C08d 3/06
U.S. Cl. 260—82.1
7 Claims

ABSTRACT OF THE DISCLOSURE

There is disclosed a process for the polymerization of butadiene and butadiene in mixture with other conjugated diolefins to form polymers containing a high portion of the butadiene units in the cis-1,4 configuration comprising contacting at least one diolefin under polymerization conditions with a binary catalyst system comprising (A) at least one nickel fluoroborate hydrate containing from 15% to 31% by weight of water of hydration and (B) at least one organometallic compound wherein the metal is selected from Groups I, II and III of the Periodic Table.

---

This invention is directed to methods of polymerizing butadiene and butadiene in mixture with other conjugated diolefins to form polymers having a high content of cis-1,4 addition. It is also directed to catalyst systems useful for this purpose.

Polymers of butadiene or butadiene in mixture with other conjugated diolefins containing a high portion of the butadiene units in the cis-1,4 configuration possess properties which make them useful as synthetic rubbers and for providing high impact resistance to plastics.

It is an object of this invention to provide a method whereby butadiene can be polymerized to a high content of cis-1,4 structure, that is, a cis-1,4 content greater than 90 percent. Another object is to provide a catalyst system by which these polymerizations may be accomplished. Another object is to form copolymers of isoprene or other conjugated diolefins and butadiene, in which the repeat units derived from butadiene have a high content of cis-1,4 structure. Other objects will become apparent as the description proceeds.

The catalytically promoted polymerization of diolefins is well known to the art. Many catalysts that have been proposed for the polymerization of 1,3-dienes are catalysts of either the Ziegler-Natta type or alkali metal catalysts such as butyllithium. Usually these prior art catalysts have yielded polydienes having mixed structures, that is, mixtures of cis-1,4; trans-1,4; 1,2- and 3,4-structure. However, several prior art catalysts have been shown to give predominantly the desirable cis-1,4 structure. One such system is a ternary catalyst system comprised of (1) an alkylaluminum halide, (2) a cerium metal chelate compound and (3) a trialkylaluminum or trialkylaluminum hydride. Another such system is also a ternary catalyst system comprised of (1) at least one organometallic compound wherein the metal is selected from a class consisting of metals of Groups I, II and III of the Periodic Table, (2) at least one organonickel salt or organonickel complex-compound and (3) at least one compound selected from a class consisting of boron trifluoride and complex-compounds thereof.

The present catalyst system differs markedly from these prior art catalyst systems in at least two major respects. The first is that the catalyst system constituting this invention is not a three component system but rather a two component system and the second major difference is that the nickel salt employed in the present invention is an "inorganic" nickel salt as opposed to the "organic" nickel salts normally employed.

Thus, according to the present invention, butadiene or butadiene in combination with other conjugated diolefins is polymerized by contact, under solution polymerization conditions, with a catalyst system comprising (A) at least one nickel fluoroborate hydrate containing from 15% to 31.7% by weight of water of hydration and (B) at least one organometallic compound wherein the metal is selected from Groups I, II and III of the Periodic Table.

Nickel fluoroborate hydrates containing varying amounts of water of hydration may be employed in the practice of this invention. A number of methods are available for obtaining nickel fluoroborate hydrates containing varying amounts of water of hydration. One such method is the azeotropic distillation of nickel tetrafluoroborate hexahydrate [Ni(BF$_4$)$_2$·6H$_2$O] with aromatic hydrocarbon and ether solvents. Representative examples of such solvents include benzene, toluene, dipropyl ether, dibutyl ether, dioxane and the like. Another method is to subject nickel tetrafluoroborate hexahydrate to heat and vacuum for a period of time sufficient to remove the desired amount of water of hydration.

While it is possible to remove all of the water of hydration in nickel tetrafluoroborate hexahydrate, it is preferred to remove only from about 3% to about 50% by weight of the water of hydration. Therefore, the nickel fluoroborate hydrates which have been found to be most active are those containing from 50% to 97% by weight of the water of hydration of the original nickel tetrafluoroborate hexahydrate from which they were derived.

The nickel fluoroborate hydrates are usually employed as suspensions in an inert solvent. By the term "inert solvent" is meant that the solvent does not adversely affect the particular nickel fluoroborate hydrate employed. Such solvents are usually aliphatic, aromatic and cycloaliphatic hydrocarbons, representative of which are pentane, hexane, heptane, benzene, toluene, cyclohexane and the like.

When considering the organometallic compounds containing metals from Groups I, II and III, it is preferred for this invention to use organolithium aluminum compounds, organoaluminum compounds, organomagnesium compounds and organozinc compounds.

By the term "organolithium aluminum" compound is meant any organolithium aluminum compound responding to the formula R'R''$_3$LiAl where R' may be hydrogen or alkyl, alkaryl or aralkyl groups and R'' may be alkyl, alkaryl or aralkyl groups. Where R' and R'' are alkyl, alkaryl or aralkyl groups, they may or may not be the same. Representative of these compounds are n-butyltriisobutyllithium aluminum, tetrabutyllithium aluminum, tetraisobutyllithium aluminum, tetraethyllithium aluminum and the like. Representative of the hydride sare triethyllithium aluminum hydride, triisobutyllithium aluminum hydride, tributyllithium aluminum hydride and the like.

By the term "organoaluminum compound" is meant any organoaluminum compound responding to the formula:

in which $R_1$ is selected from a group consisting of hydrogen, fluorine, and a monovalent hydrocarbon radical such as alkyl, alkenyl, aryl, aralkyl, alkaryl, cycloalkyl and alkoxy containing from about 1 to about 20 carbon atoms and $R_2$ and $R_3$ are monovalent hydrocarbon radicals selected from a group consisting of alkyls, alkenyls, aryls, aralkyls, alkaryls and cycloalkyls containing from 1 to about 20 carbon atoms. Representative of the compounds responding to the formula set forth above are: diethylaluminum fluoride, di-n-propylaluminum fluoride, di-n-butylaluminum fluoride, diisobutylaluminum fluoride, di-hexylaluminum fluoride, dioctylaluminum fluoride and diphenylaluminum fluoride. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenyl ethylaluminum hydride, phenyl n-propylaluminum hydride, p- tolylethylaluminum hydride, p-tolyl n-propylaluminum hydride, p-tolyl isopropylaluminum hydride, benzyl ethylaluminum hydride, and other organoaluminum hydrides. Also included are ethoxydiethylaluminum, ethoxydipropylaluminum, ethoxydiisobutyl aluminum and other alkoxydialkyl-aluminum compounds. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyldi-p-tolylaluminum, ethyldibenzylaluminum, diethylphenylaluminum, diethyl-p-tolylaluminum, diethylbenzylaluminum and other triorganoaluminum compounds.

By the term "organomagnesium compounds" is meant, first, any organomagnesium complex responding to the formula $R_aMgX_b$ where R is a monovalent hydrocarbon radical such as alkyl, alkenyl, aryl, alkaryl, aralkyl and cycloalkyl containing from 1 to about 20 carbon atoms; X is a halogen, and $a$ and $b$ are mole fractions whose sum equals 2 while the ratio of $a/b$ is greater than 2 but is not infinite. Representative among the compounds responding to the formula set forth above are ethylmagnesium chloride complex, cyclohexylmagnesium bromide complex and phenylmagnesium chloride complex. Such compounds are usually prepared in the absence of ether.

Also, "organomagnesium compounds" means any organomagnesium compound or any organomagnesium halide of the Grignard type corresponding to the formulae $R_2Mg$ or $RmgY$ where R may be alkyl, alkenyl, aryl, aralkyl or alkaryl and Y is fluoride or $R'R''Mg$ where R' may be alkyl, alkenyl, aryl or alkaryl and R'' may be either alkyl, alkenyl, aryl, aralkyl or alkaryl. Representative among the compounds responding to these formulae are diethylmagnesium, dipropylmagnesium, ethylmagnesium fluoride and phenylmagnesium fluoride.

By the term "organozinc compound" is meant any organozinc compound responding to the formula $R_2Zn$ where R is a monovalent hydrocarbon radical such as alkyl, alkenyl, aryl, aralkyl, alkaryl and cycloalkyl containing from about 1 to about 20 carbon atoms. Representative among such compounds are diethylzinc, dibutylzinc or diphenylzinc.

Representative of other organometallic compounds with metals selected from Groups I, II and III of the Periodic Table are compounds containing at least one of the metals, sodium and potassium, combined with at least one organic radical selected from the group consisting of alkyls, alkaryls, aralkyls and aryls.

The two component catalyst system of this invention has shown polymerization activity over a wide range of catalyst concentrations and catalyst ratios. Apparently, the two catalyst components interact to form the active catalyst. As a result, the optimum concentration for any one catalyst component is dependent upon the concentration of the other catalyst component. Although polymerization will occur over a wide range of catalyst concentrations and ratios, polymers having the most desirable properties are obtained over a narrower range. It has been found that polymerization will occur when the mole ratio of the (B) component of the catalyst system to the (A) component of the catalyst system ranges from about 0.05/1 to about 10/1. The preferred $(B)/(A)$ mole ratio ranges from about 0.20/1 to about 4/1.

The two catalyst components may be charged to the polymerization system as separate catalyst components in either a stepwise or a simultaneous manner, sometimes called "in situ." The catalyst may also be "preformed" outside the polymerization system whereby the catalyst components are mixed in the absence of the butadiene, either with or without an inert diluent and the resulting complete blend then added to the polymerization system.

The catalyst may also be "preformed" outside the polymerization system whereby all the catalyst components are mixed in the presence of small amounts of butadiene or other conjugated diolefins. The amount of the butadiene present can vary over a wide range but must be a catalytic amount. For good results the molar ratio of butadiene to the (A) catalyst component can range from about 1/1 to about 1000/1. A preferred mole ratio of butadiene to the (A) catalyst component ranges from about 3/1 to about 300/1.

The concentration of the total catalyst system employed depends on a number of factors such as purity of the system, polymerization rate desired, temperature and other factors, therefore, specific concentrations cannot be set forth except to say that catalytic amounts are used. Some specific concentrations and ratios which produce polymers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, cycloaliphatic hydrocarbons and ethers, representative of which are pentane, hexane, heptane, toluene, benzene, cyclohexane, diisopropyl ether and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerizations of this invention employing air-free and moisture-free techniques.

The temperatures employ in the practice of this invention have not been found to be critical and may vary from a low temperature, such as $-10°$ C. or below, up to high temperatures of $100°$ C. or higher. However, a more desirable temperature range is between about $20°$ C. and about $80°$ C. Ambient pressures are usually used but higher or lower pressures may be employed.

As employed in this specification, inherent viscosity, $[\eta]$, is defined as the natural logarithm of the relative viscosity at 30° C. divided by the polymer concentration for a 0.5 percent (wt./vol.) solution in toluene and is expressed in deciliters per gram (dl./g.).

The cis-1,4 structure of the polymers was determined by reference to the following examples which are intended to be representative rather than restrictive of the scope of the invention.

EXAMPLE I

A purified butadiene (BD) in benzene solution containing 100 grams (g.) of butadiene per liter of solution was charged into 4-ounce bottles. Nitrogen was flushed over the surface of the premix and the catalyst charged "in situ" in the amounts shown in Table I below. The "in situ" catalyst employed consisted of a 0.25 molar solution of tetraethyllithium aluminum (LiAlEt$_4$) in a mixture containing about 20 percent tetrahydrofuran and 80 percent benzene and a 0.6 molar suspension of nickel fluoroborate hydrate [Ni(BF$_4$)$_2$·XH$_2$O] in benzene. The Ni(BF$_4$)$_2$·XH$_2$O was prepared by the azeotropic distillation of Ni(BF$_4$)$_2$·6H$_2$O with anhydrous benzene to remove a part of the water of hydration. The sealed bottles were tumbled end-over-end in a 50° C. water bath. The polymerizations were deactivated by the addition of a suitable stopping agent and an antioxidant. Table I contains representative data.

TABLE I.—SOLVENT, BENZENE

| | Millimoles/100 g. BD | | Reaction time, hrs. | Yield, weight percent | [η] |
|---|---|---|---|---|---|
| | LiAlEt$_4$ | Ni fluoroborate | | | |
| Experiment No. | | | | | |
| 1 | 0.75 | 0.26 | 18 | 72 | 3.0 |
| 2 | 1.0 | 0.34 | 18 | 89 | 2.6 |
| 3 | 1.0 | 2.5 | 18 | 90 | (¹) |
| 4 | 1.5 | 1.0 | 18 | 95 | 1.9 |
| 5 | 1.0 | 0.34 | 4 | 39 | 2.7 |
| 6 | 1.0 | 1.0 | 4 | 60 | 2.1 |
| 7 | 1.0 | 2.5 | 2 | 69 | 1.6 |
| 8 | 1.5 | 1.0 | 4 | 79 | 2.0 |
| 9 | 1.5 | 3.0 | 2 | 75 | 1.5 |
| 10 | 1.5 | 3.0 | 18 | 96 | (¹) |

¹ Not determined.

The following four examples illustrate the effects of nickel fluoroborate hydrates, having varying amounts of water of hydration, on the polymerization of butadiene.

EXAMPLE 2

A series of polymerizations was carried out similar to Example I above except that a nickel fluoroborate hydrate [Ni(BF$_4$)$_2$·XH$_2$O] containing approximately 4 moles of water of hydration was employed. The partially dehydrated Ni(BF$_4$)$_2$·XH$_2$O was prepared by subjecting Ni(BF$_4$)$_2$·6H$_2$O to heat and vacuum (110° C. and 29 inches of mercury vacuum) for 60 hours. The nickel fluoroborate hydrate was then suspended in dry benzene to give a concentration of 0.24 molar (M). Table II below contains representative data. All reactions were carried out at 50° C. for 18 hours.

TABLE II

| | Millimoles/100 g.BD | | Yield, weight percent | [η] |
|---|---|---|---|---|
| | LiAlEt$_4$ | Ni fluoroborate | | |
| Experiment No.: | | | | |
| 1 | 0.75 | 0.26 | (¹) | |
| 2 | 1.0 | 0.34 | (¹) | |
| 3 | 1.0 | 1.0 | (¹) | |
| 4 | 1.0 | 2.5 | 91 | 2.2 |
| 5 | 1.5 | 1.0 | (¹) | |
| 6 | 1.0 | 3.5 | 91 | 2.0 |
| 7 | 1.5 | 4.0 | 97 | 2.0 |

¹ No reaction.

EXAMPLE III

A series of polymerizations was carried out similar to Example II above except that the nickel fluoroborate hydrate [Ni(BF$_4$)$_2$·6H$_2$O] was dried at 94° C. and 29 inches of mercury vacuum for 16 hours. The amount of weight loss during the drying was equivalent to 29 percent of the theoretical water of hydration. The nickel fluoroborate hydrate [Ni(BF$_4$)$_2$·XH$_2$O] was then suspended in a sufficient quantity of dry benzene to give a concentration of 0.21 M. The catalyst components were charged "in situ" in the amounts shown in the table below. All reactions were carried out at 50° C. for 18 hours with the exception of Experiment No. 3 which was reacted for four hours. Table III contains representative data.

TABLE III

| | Millimoles/100 g.BD | | Yield, weight percent | [η] |
|---|---|---|---|---|
| | LiAlEt$_4$ | Ni fluoroborate | | |
| Experiment No.: | | | | |
| 1 | 0.75 | 0.26 | 40 | 3.3 |
| 2 | 1.0 | 0.34 | 66 | 3.0 |
| 3 | 1.0 | 1.0 | 50 | 2.3 |
| 4 | 1.0 | 2.5 | 83 | 1.8 |
| 5 | 1.5 | 1.0 | 93 | 1.9 |

EXAMPLE IV

A series of polymerizations was carried out similar to Example II above except that the nickel fluoroborate hydrate [Ni(BF$_4$)$_2$·6H$_2$O] was dried at 84° C. under a vacuum of 29 inches of mercury for 16 hours. The weight loss was equivalent to 9 percent of the theoretical water of hydration. The partially dehydrated nickel fluoroborate was then suspended in dry benzene to give a concentration of 0.20 M. The catalyst components were charged "in situ." All reactions were carried out at 50° C. for 18 hours. Table IV contains all relevant data.

TABLE IV

| | Millimoles/100 g.BD | | Yield, weight percent | [η] |
|---|---|---|---|---|
| | LiAlEt$_4$ | Ni fluoroborate | | |
| Experiment No.: | | | | |
| 1 | 0.75 | 0.26 | 7 | (¹) |
| 2 | 1.0 | 0.34 | ² 57 | 3.3 |
| 3 | 1.0 | 1.0 | 73 | 2.3 |
| 4 | 1.0 | 2.5 | 79 | 2.1 |
| 5 | 1.5 | 1.0 | 94 | 2.0 |

¹ Not determined.
² Infrared analysis of this sample indicated a microstructure containing 96.0% cis-1,4; 1.8% trans-1,4 and 2.2% 1,2-structure.

EXAMPLE V

A series of polymerizations was carried out similar to Example I above except that a nickel fluoroborate hydrate containing 6.0 moles of water of hydration was employed. This particular nickel fluoroborate hydrate is represented by the formula Ni(BF$_4$)$_2$·6H$_2$O in the table below. All reactions were carried out at 50° C. for 18 hours and the catalyst components charged employing the "in situ" technique. Representative data is presented in Table V below.

TABLE V

| | Millimoles/100 g. BD | | Yield, weight percent |
|---|---|---|---|
| | LiAlEt$_4$ | Ni(BF$_4$)$_2$·6H$_2$O | |
| Experiment No.: | | | |
| 1 | 0.75 | 0.26 | 9 |
| 2 | 1.0 | 0.34 | (¹) |
| 3 | 1.0 | 1.0 | (¹) |
| 4 | 1.0 | 2.5 | (¹) |
| 5 | 1.5 | 1.0 | ² 53 |

¹ No reaction.
² Inherent viscosity was 2.9.

EXAMPLE VI

Two experiments were carried out on a butadiene-benzene premix containing 100 grams of butadiene per liter of solution, employing a catalyst system consisting of a 0.21 molar suspension in benzene of a nickel fluoroborate hydrate which had lost weight equivalent to 29 percent of the theoretical water of hydration while drying at 94° C. under a vacuum of 29 inches of mercury for 16 hours and a 0.25 molar solution of LiAlEt$_4$ in a solvent mixture containing 80 percent benzene and 20 percent tetrahydrofuran. The catalyst components were charged "in situ" in the amounts shown in the table below. Experiment No. 1 was carried out at 50° C. and Experiment No. 2 was carried out at 80° C. Both experiments were reacted for 18 hours.

TABLE VI

| | Millimoles/100 g. BD | | Yield, weight percent | [η] | Percent cis-1,4 |
|---|---|---|---|---|---|
| | LiAlEt$_4$ | Ni(BF$_4$)$_2$· 4.3 H$_2$O | | | |
| Experiment No.: | | | | | |
| 1 | 1.0 | 1.0 | 85 | 2.3 | 95.7 |
| 2 | 1.0 | 1.0 | 79 | 1.6 | 94.5 |

Example VII

A series of polymerizations was carried out on a butadiene-benzene premix containing 100 grams of butadiene per liter of solution employing a "preformed" catalyst consisting of 15 millimoles of butadiene, 1.0 millimole of LiAlEt$_4$ and 3.1 millimoles of Ni(BF$_4$)$_2$·XH$_2$O in anhydrous benzene. The Ni(BF$_4$)$_2$·XH$_2$O was prepared by the azeotropic distillation of Ni(BF$_4$)$_2$·6H$_2$O with toluene to remove a part of the water of hydration and the addition of sufficient benzene to give a 0.45 molar suspension. In experiment Nos. 1 and 2, this preformed catalyst was employed without aging while in experiment Nos. 3 and 4, the preformed catalyst was aged for 30 minutes at 50° C. before being used to catalyze the reactions. Representative data are given in Table VII below. All polymerizations were carried out at 50° C. for 18 hours.

TABLE VII

| | Millimoles/100 g. BD | | | Yield, weight percent | [η] |
|---|---|---|---|---|---|
| | BD | LiAlEt$_4$ | Ni fluoroborate | | |
| Experiment No.: | | | | | |
| 1 | 15 | 1.0 | 3.1 | 99 | 1.5 |
| 2 | 22.5 | 1.5 | 4.6 | 100 | 1.3 |
| 3 | 15 | 1.0 | 3.1 | 95 | [1]1.8 |
| 4 | 22.5 | 1.5 | 4.6 | 99 | 1.5 |

[1] The cis-1,4 content of this polymer was found to be 95.5% by infrared analysis.

While certain representative embodiments and details have been shown for the purpose of illustrating the invention, it will be apparent to those skilled in this art that various changes and modifications may be made therein without departing from the spirit or scope of the invention.

What is claimed is:
1. A process for the polymerization of butadiene and butadiene in mixture with other conjugated diolefins to form polymers containing more than 90 percent of the butadiene units in the cis-1,4 configuration comprising contacting at least one diolefin under polymerization conditions with a binary catalyst system comprising (A) at least one nickel fluoroborate hydrate containing from 15% to 31% by weight of water of hydration and (B) at least one organometallic compound wherein the metal is selected from Groups I, II and III of the Periodic Table.

2. A process according to claim 1 in which the diolefin is 1,3-butadiene.

3. A process according to claim 1 in which the (B) catalyst component is an organolithium aluminum compound.

4. A process according to claim 1 in which the mole ratio of catalyst component (B) to catalyst component (A) ranges from about 0.05/1 to about 10/1.

5. A process according to claim 1 in which the mole ratio of catalyst component (B) to catalyst component (A) ranges from about 0.2/1 to about 4/1.

6. A catalyst composition comprising (A) at least one nickel fluoroborate hydrate containing from 15% to 31% by weight of water of hydration and (B) at least one organolithium aluminum compound.

7. A process according to claim 3 in which the organolithium aluminum compound is tetraethyllithium aluminum.

References Cited

UNITED STATES PATENTS

| 3,215,682 | 11/1965 | Farrar et al. | 260—94.3 |
| 3,431,248 | 3/1969 | Kanbara et al. | 260—94.3 |
| 3,484,425 | 12/1969 | Yamawaki et al. | 260—94.3 |

JOSEPH L. SCHOFER, Primary Examiner

R. A. GAITHER, Assistant Examiner

U.S. Cl. X.R.

252—429; 260—94.3

PO-1050
(5/69)

UNITED STATES PATENT OFFICE
CERTIFICATE OF CORRECTION

Patent No. 3,577,396      Dated May 4, 1971

Inventor(s) Morford C. Throckmorton

It is certified that error appears in the above-identified patent and that said Letters Patent are hereby corrected as shown below:

Column 5, line 4 after "determined" a line has been left out. The line is as follows:

-- by infrared analysis. The practice of this invention is further illustrated --.

Signed and sealed this 2nd day of May 1972.

(SEAL)
Attest:

EDWARD M. FLETCHER, JR.
Attesting Officer

ROBERT GOTTSCHALK
Commissioner of Patents